W. T. SEARS.
THROTTLE CONTROLLING APPARATUS.
APPLICATION FILED FEB. 25, 1919.
1,307,794.
Patented June 24, 1919.
2 SHEETS—SHEET 2.
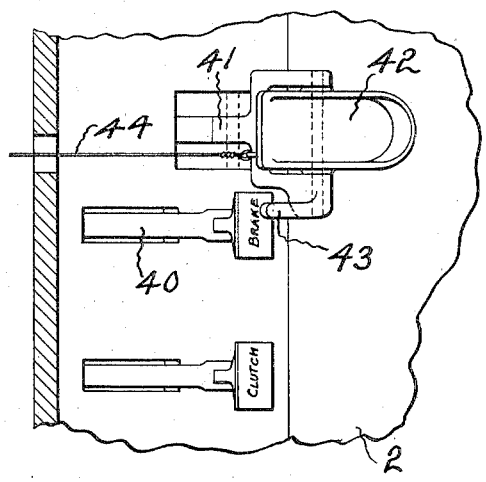
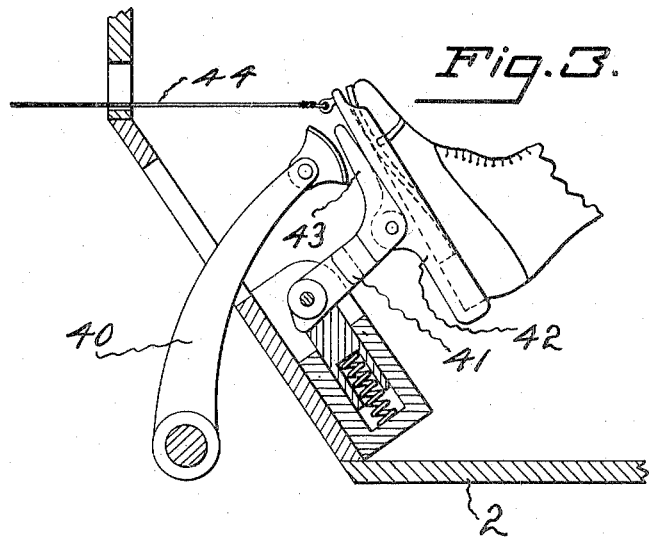

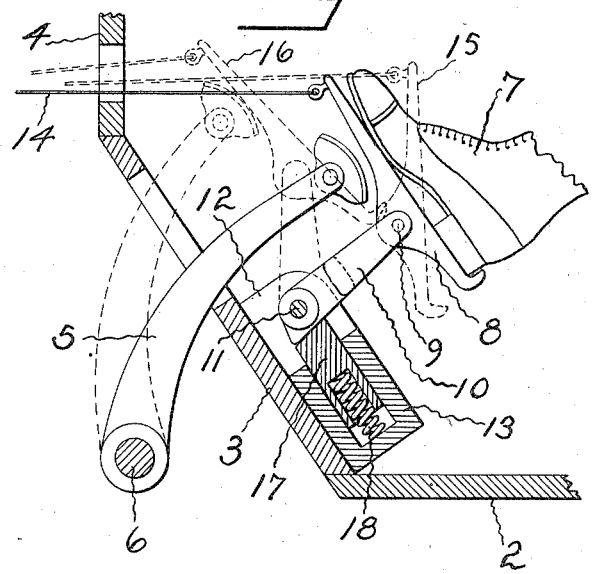
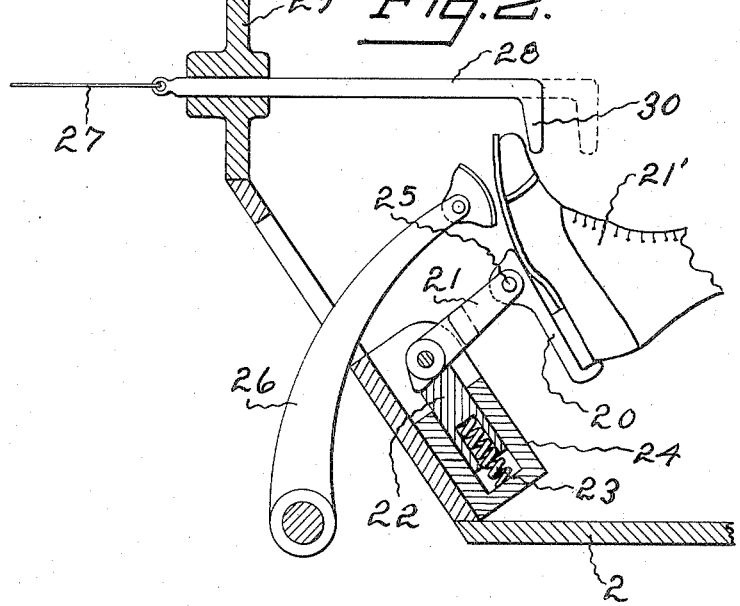

UNITED STATES PATENT OFFICE.

WILLARD T. SEARS, OF NEW YORK, N. Y.

THROTTLE-CONTROLLING APPARATUS.

1,307,794.          Specification of Letters Patent.     Patented June 24, 1919.

Application filed February 25, 1919. Serial No. 279,093.

*To all whom it may concern:*

Be it known that I, WILLARD T. SEARS, a citizen of the United States, residing at New York, in the county of New York and State of New York, have invented certain new and useful Improvements in Throttle-Controlling Apparatus, of which the following is a specification.

This invention relates to throttle controlling apparatus. Throttle controlling apparatus involving the invention is susceptible of general use, although the same is of particular utility when employed in connection with an automobile. I have several motives in view, one of them being the provision of means of the character set forth, which can be built as a separate unit and applied to an existing automobile without appreciable change in the mechanism thereof. The device is simple in construction and effective and positive in action.

There are several ways in which the invention can be carried into effect. In the drawings accompanying and forming part of the present specification I have shown two of these, which I will set forth rather in detail in the following description to enable those skilled in the art to practise the invention. I am not, however, restricted to this precise disclosure. I may depart therefrom in several ways within the scope of the invention defined by the claims following said description.

Referring to said drawings:

Figure 1 is a sectional side elevation of a throttle controlling mechanism involving the invention and shown embodied in an automobile partly illustrated.

Fig. 2 is a similar view of another form.

Fig. 3 is a like view of a different form.

Fig. 4 is a top plan view of the same.

I have shown the foot board 2 of an automobile. The forward portion 3 of this foot board is at an upward inclination. The dash 4 rises from the upper end of the inclined portion 3. The brake lever may be of any suitable character; that shown by 5 answering my requirements. The brake lever 5 is fastened to a pivot or shaft 6. I am of course now describing the construction shown in Fig. 1. The brake lever in said view is shown as off or out, as it is known by full lines, at which time the brake is off or inactive; that is, it is not set. By dotted lines I have shown it in an in or on position, the brake at such time being set or operative. I have not, however, shown any connections with the brake lever 5 by which the brake may be set. They may be of any desirable character. As a matter of fact, I am somewhat briefly describing an old construction in association with which my improvement may properly act, and the brake lever so far as the action of the brake mechanism is concerned, may function in the manner shown in my Patent No. 1,236,489 of August 14, 1917, to which reference may be had.

The foot 7 of the chauffeur during driving is supported by the foot rest 8, the length of which is approximately equal to that of the foot. It should be noticed that this foot rest 8 is supported independently of the brake lever 5. As shown, the foot lever is pivotally supported on its under side, intermediate its ends, as at 9 to arm 10, which is illustrated as pivoted, as at 11, between the ears or lugs 12, extending forwardly from the sides of the block 13, fixed in some convenient way to the inclined portion 3 of the foot board. The upper or forward portion of the foot rest 8 is connected operatively with the throttle of the engine, while the engine and its throttle however are not shown. I have shown a rod or wire, as 14, which is connected to the throttle and which is also jointed to the upper forward portion of the foot rest 8. The said foot rest 8 is held in its normal position, as I will hereinafter explain, and as shown by full lines in Fig. 1. Should the said foot rest be tipped backwardly, as shown by dotted lines, 15, the throttle will be opened to accelerate the engine, whereas, tipping the foot lever forwardly, as shown by dotted lines, 16, will bring about the closing movements of the throttle, and as a result stop the engine. I provide in the latter case for the setting or practically simultaneous setting of the brake.

The block 13 to which I have referred, slidingly receives the plunger 17, socketed to receive the push spring 18, bearing at its rear against the back of the block 13, the forward end of the spring bearing against the bottom of the socket in which it is seated. The front end of the spring controlled plunger 17 acts against the lever 10 adjacent its axis of motion. It will be seen that the foot rest 10 is practically back of and disconnected and free from the brake lever 5.

The full lines in Fig. 1 show the parts as occupying their normal positions, the brake mechanism being unset, at which time the foot rest 8 is free of the upper end of the brake lever. By tipping the foot rest 8 backwardly the throttle will be opened through the retraction or drawing back of the connection, rod or wire 14 to accelerate the motor, the dotted position 15 showing the position occupied by the foot rest during what might be considered maximum acceleration. It will be assumed that it is desired to set the brake mechanism. In this case the following action will occur. The foot rest 8 will be tipped forward to the dotted line position 16 in a direction thus advancing the connection, rod or wire 14, to permit shutting of the throttle and at the same time it will be bodily advanced forward practically to the dotted line position 16. During this compound movement, as it were, of the foot rest, its under forward side will engage against the upper end of the brake lever 5 and thus throw the brake lever forward to the dotted line position to set the brake mechanism, this action occurring practically at the time that the throttle is closed. When the chauffeur frees the foot rest 8, the compressed spring 18, by reaction, will through the plunger 17, acting against the lever 10, return said lever to its initial position, as shown by full lines.

In Fig. 2 the foot rest 20 is not exactly like the one designated by 8. It is practically one-half as long and is intended thus to support the rear portion of the foot 21 of the chauffeur. This foot rest 20 is pivotally supported by the lever 21 acted on by the spring plunger 22 governed by the spring 23 and both in a socket in the block 24. The lever 21 is mounted, controlled and operates exactly like the lever 10. The foot rest 20 is pivotally supported as at 25, by the upper portion of the lever 21. In the construction of Fig. 2, however, the foot rest does not act directly against the brake lever 26, but the forward portion of the foot does, to set the brake mechanism by and on the forward movement of the brake lever. The throttle also is not connected with the foot rest 20, although the foot does furnish the means by which the throttle is controlled. Extending rearward from the throttle is the rod or wire 27, jointed at its rear end to the bar 28, slidingly extending through an opening in the dash 29, and having at its rear end the downward extension 30, positioned to co-operate with the foot 21'. During driving the tip of the foot is against the front side of this pendant projection 30, so that by tipping the foot backward, the bar 28 and hence the wire 27, can be longitudinally moved rearward to open the throttle, closing thereof being accomplished by a spring. The dotted lines in Fig. 2 show the bar 28 as moved backward by the foot 21 to open the throttle, this being assumed to be the maximum movement. By tipping the foot 21' forward, during which the foot rest 20 of course is likewise tipped, the foot 21' can reach the upper end of the brake lever 26 to set the brake mechanism and concurrently will free or move away from the projection 30, so that the throttle may be closed by spring means or otherwise when the brake mechanism is set. Freeing of the brake will of course result in the movement of the parts to their full line positions.

In Figs. 3 and 4 I show a brake lever 40 which is exactly like the brake levers 5 and 26. To the rear and at one side of this brake lever 40 is located a lever 41 mounted exactly like the levers 10 and 21. The upper portion of lever 41 carries at its upper forked end the foot rest 42 pivoted on its under side between its ends to the branches of the forked upper portion of the lever 41. The supporting lever 41 has a lateral projection or extension 43 of practically segmental form. This segmental projection 43 is adapted to engage against the upper end of the brake lever 40 to set the brake when the foot rest 42 is advanced in the manner described in connection with the foot rest 8. To this foot rest 42 the throttle of the engine is connected by the rod 44, the result being that when the brake 40 is operated to set the brake mechanism, the throttle valve through its connection with the foot rest 42 will be closed at the same time.

It will be seen that the organization can be mounted without a change of the brake lever or its mechanism, the construction being such that the controlling parts, as it were, can be mounted and used as a unit. The spring means to which I have referred is of such character that it offers a firm rest for the foot of the operator when he is controlling the throttle movement by means of his foot. This spring support should preferably offer a decreasing resistance to the foot movement as the foot is advanced. This decreasing, or non-increasing resistance, while preferable, is not absolutely essential; the main feature being that the spring should act against a stop, or against such a formed part of the lever which supports the foot, that it holds the lever in a predetermined firm position, from which it requires an appreciable effort on the part of the operator to move it out.

I deem it proper to make clear the fact that by the mechanism shown the throttle may not be fully closed. It is of course controlled by means on the steering post of the automobile or in some other way as is common at the present time. However, by the mechanism shown, I can cause the closing movement of the throttle valve, although it may not be fully shut, by one action, and the opening of the throttle valve by an opposite action.

The showing in this application, generally speaking, is such as has been adopted in several cases of applicant. The throttle valve is not necessarily fully closed by the forward movement of the rod 14, but it is caused to move toward its closed position by the action of spring means or in some equivalent way, when the rod 14 is moved toward the left in Fig. 1. This point has, it is thought, been brought out more fully in the case. When certain claims such as 6 and 7 speak of the closing of the throttle valve, this it is submitted, does not necessarily imply that the valve in question is fully shut.

What I claim is:

1. A throttle-controlling apparatus for automobiles comprising a brake lever, a connection to the throttle-valve, a foot-rest supported independently of the brake lever, and means whereby said connection will be advanced when the foot on the foot-rest acts on the lever to operate the brake lever for setting the brake mechanism.

2. A throttle-controlling apparatus for automobiles comprising a brake-lever, a connection to the throttle-valve, a foot-rest supported independently of the brake lever, means whereby said connection will be advanced when the foot on the foot-rest acts on the lever to operate the brake-lever for setting the brake mechanism, and means for yieldingly holding the foot rest in its normal position.

3. A throttle-controlling apparatus for automobiles comprising a brake-lever, a connection to the throttle valve, a foot-rest, a spring actuated lever supporting the foot rest, means whereby said connection will be advanced when the foot on the foot lever acts on the lever to operate the brake lever for setting the brake mechanism.

4. A throttle controlling apparatus for automobiles comprising a brake lever, a foot rest supported independently of the brake lever, a connection from the foot rest adapted for operative association with the throttle valve, the foot rest being adapted to directly engage the brake lever to set the same when it is operated to advance said connection.

5. A throttle controlling apparatus for automobiles comprising a brake lever, a connection adapted for operative association with the throttle valve, and a foot rest supported independently of the brake lever, for supporting the rear portion of the foot, the foot being adapted to advance said connection and at the same time to engage said brake lever to set the brake mechanism.

6. A throttle controlling apparatus for automobiles comprising a brake lever, a foot rest supported independently of and at one side of the brake lever, a connection adapted for operative association with the throttle valve, the foot rest being operable by the foot to advance said connection, the foot rest having a lateral projection to engage the brake lever to set the brake mechanism concurrently with the advance of the connection.

In testimony whereof I affix my signature in the presence of two witnesses.

WILLARD T. SEARS.

Witnesses:
O. S. ACKLEY,
A. BERTRAND.